United States Patent [19]

Bürkner

[11] Patent Number: 4,666,029

[45] Date of Patent: May 19, 1987

[54] METHOD AND APPARATUS FOR LONGITUDINAL ORIENTATION OF WOOD CHIPS

[75] Inventor: Wolfgang H. Bürkner, Darmstadt, Fed. Rep. of Germany

[73] Assignee: Carl Schenck AG, Fed. Rep. of Germany

[21] Appl. No.: 748,844

[22] Filed: Jun. 26, 1985

[30] Foreign Application Priority Data

Sep. 21, 1984 [EP] European Pat. Off. ........ 84111261.8

[51] Int. Cl.[4] ................................................ B65G 47/24

[52] U.S. Cl. .................................... 198/382; 198/533; 425/110

[58] Field of Search ............... 198/382, 383, 390, 392, 198/393, 396, 397, 533; 425/81.1, 82.1, 83.1, 110

[56] References Cited

FOREIGN PATENT DOCUMENTS 1174058 1/1965 Fed. Rep. of Germany .
2535382 2/1978 Fed. Rep. of Germany ...... 198/382

*Primary Examiner*—Joseph E. Valenza
*Assistant Examiner*—Lyle Kimms
*Attorney, Agent, or Firm*—Connolly and Hutz

[57] ABSTRACT

In a procedure for the longitudinal orientation of chips, particularly during the manufacturing of OSB boards, spaced apart discs are located on rotating shafts sequentially one after the other. The discs are positioned above a forming belt that receives the chips after they are oriented by the discs. The discs are located on each of the shafts, and these discs together with the longitudinal side walls of an enclosure for the discs, function to longitudinally orient the wood chips to the point of deposit upon the forming belt.

10 Claims, 12 Drawing Figures

METHOD AND APPARATUS FOR LONGITUDINAL ORIENTATION OF WOOD CHIPS

BACKGROUND OF THE INVENTION

The present invention relates to a procedure for the longitudinal orientation of wood chips and the like, particularly during the production of OSB boards (Oriented Strandboard). Discs rotating in the direction as chip flow are positioned above a moving base that receives the chips. The discs are arranged on shafts at corresponding distances from the moving base, and the discs are equidistant from one another.

A device for production of a particleboard containing oriented wood particles of varying dimensions is known from West German Pat. No. 11 74 058 in which a number of orientation elements, movable in relation to one another and connected with a drive device, are arranged on a plane inclined to the horizontal. The orientation elements are generally parallel to one another, forming narrow orientation passages. The width of these passages and the distance between the lower edges of the orientation elements and the surface on which the layer of chips is formed are only slightly greater than the average length of the wood particles. Due to the movements of the orientation elements relative to one another and the distance between the elements, such a device for longitudinal orientation of chips is not suitable for longitudinal orientation of chips during the production of OSB boards. The distance between the orientation elements allows the chips, which are to be longitudinally oriented, to assume positions at right angles to the longitudinal orientation, since the longest guidance of the chips to be longitudinally oriented generally occurs only along the common chord of two adjacent elements and the adjacent elements are attached to two different and sequentially arranged shafts. Since the orientation elements located on other shafts affect a positioning of chips to be longitudinally oriented over a distance which is only slightly greater than the average lengths of the wood particles, the major portion of the chips to be longitudinally oriented does not fall through these orientation elements in a properly oriented manner. Since they are not influenced by the orientation elements, they are generally deposited onto the receiving base in an arbitrary and unoriented manner. Also, since the orientation elements on one shaft are located at a distance from one another which is at least double the average length of the wood particles, many of the chips do not fall through the elements in a properly oriented manner.

There has been no lack of attempts to eliminate the shortcomings with respect to chip orientation. For example, devices are known in which stationary metal grids are arranged in the transport direction and extended below the shafts carrying the orientation discs whereby the individual discs also extend into these grids. Attempts have been made to force a longitudinal orientation of the chips by means of spiked devices arranged on the discs. However, the result is a device in which the passage width in the unaffected area of the grid is only slightly greater than half the average length of the wcod particles, and the width of each passage through the grid is decreased at the entrance area to the grid, namely by the intruding discs. Moreover, in cases of extreme errors in the chip dimensions or if splinter material is present, blockages may occur.

Orientation problems increase with increasing chip dimensions and reach their maximum when strands are to be oriented. The strands to be oriented consist of wood particles with dimensions which do not correspond to those chip dimensions defined for production of normal particleboards. In this case, wood particles (strands) are to be oriented which are preferably 70 mm long, 10–30 mm wide and 0.5–1 mm thick. Furthermore, it is impossible to avoid splinters and extreme overdimensions in this type of wood processing, unless additional and costly sorting devices and devices for after-treatment are provided.

SUMMARY OF THE INVENTION

Accordingly, an object of the present invention is a process for the longitudinal orientation of wood strands in the manufacture of particleboard which is simple, effective and economical.

Another object of the invention is an apparatus for the longitudinal orientation of strands which is highly effective and economical.

The purpose of the invention is a procedure and a device for executing the procedure whereby an unequivocal guidance takes place in the entire vertical area of the longitudinal orientation of wood strands in the manufacture of particleboard. No elements in the orientation area obstruct an oriented deposit of the strands or cause blockages. By means of rotating vertical discs at specific distances from one another, complete guidance of the strands to be oriented is accomplished up to a point directly above the moving base.

Tilting of the chips, particularly of the strands, functions to significantly contribute to the non-blocking entrance of the strands between the discs.

Interacting discs may be provided on several sequentially arranged shafts to form partitions in a rotating disc grid. By selecting appropriate distances between the discs of about half the average chip length, complete orientation is achieved.

Different disc diameters may also be used to accomplish proper chip orientation, according to the invention. Also, the discs may partially touch each other and exert a cleaning action when sliding past one another.

Moreover, the outermost discs may be provided with radial spikes on their outer sides in order to keep the area between the housing and the outermost disc free of chips. Blockages of these passage openings are thus prevented.

BRIEF DESCRIPTION OF THE DRAWING

Novel features and advantages of the present invention in addition to those noted above will become apparent to those skilled in the art from a reading of the following detailed description in conjunction with the accompanying drawing wherein similar reference characters refer to similar parts and in which.

DETAILED DESCRIPTION OF THE INVENTION

Figure 1:
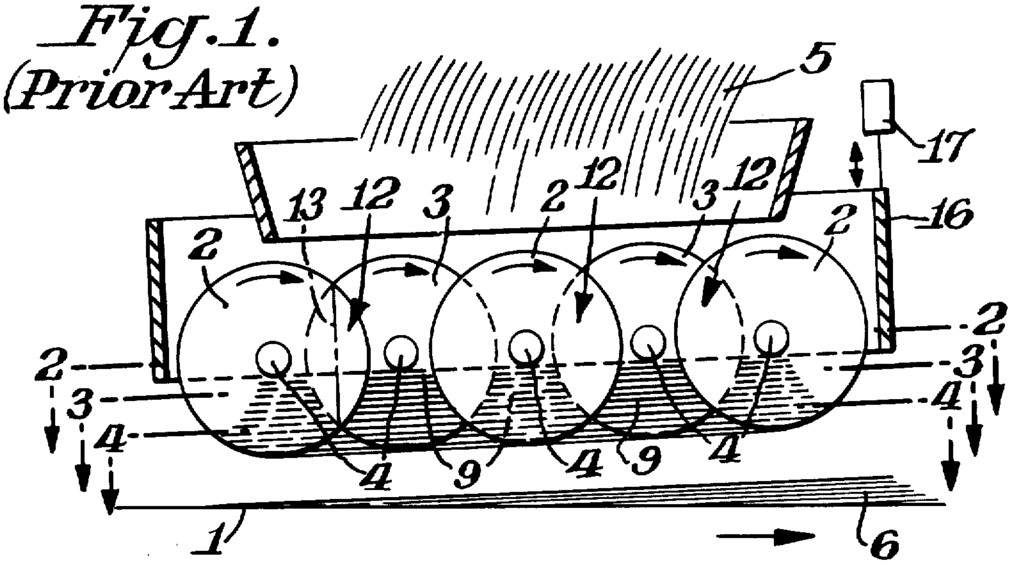
Fig. 1. (Prior Art)
FIG. 1 is a side elevational view with portions in section illustrating a wood chip orientation device as is well known in the prior art.

Referring in more particularity to the drawing, FIG. 1 shows a non-oriented chip mass 5 brought to a depositing station on a forming belt 1 via a first set of discs 2 and a second set of discs 3 arranged on rotating shafts 4. The chip mass 5 passes through the rotating discs and is deposited onto belt 1 in the form of mat 6. Shafts 4 are located in a housing 16 which can be moved vertically in order to be adjusted to the scattering angle of the chip. A prime mover 17 is connected to move the housing 16.

Figure 2:
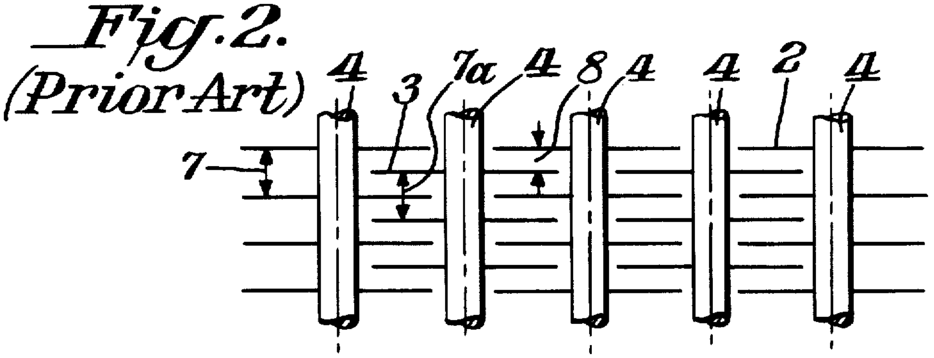
Fig. 2. (Prior Art)
FIG. 2 is a sectional view taken along line 2—2 of FIG. 1.
Figure 3:
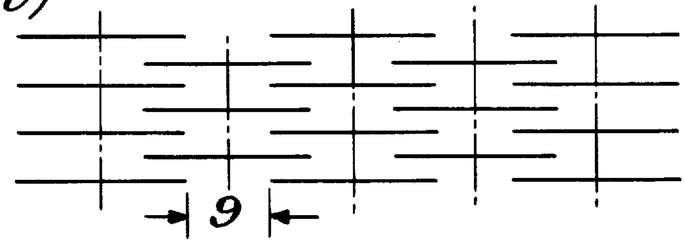
Fig. 3. (Prior Art)
FIG. 3 is a sectional view taken along line 3—3 of FIG. 1.

The orientation according to the state of the art is achieved by means of the first set of discs 2 and the second set of discs 3. As shown in the sectional views of FIGS. 2 and 3, the projection of the first set of discs 2 overlaps the second set of discs 3 only in a very small area. Basically, the orientation of the chips depends upon the distance 7 between the discs 2 of the first set and the distance 7*a* between the discs 3 of the second set. These distances 7 and 7*a* are equal to one another. Only along a vertical plane 13, which is vertical to the transport direction and parallel to the shafts 4 and which contains the common chords of the first set of discs 2 and the second set of discs 3, will there be an orientation by means of an additional distance 8 between the first set of discs 2 and the second set of discs 3. The moderate orientation effect of such an orientation device is apparent, since the distances 7 and 7*a*, which extend over the entire vertical height of the discs 2,3 does not cause any orientation effect on those chips which are shorter than these distances. Additionally, variable free spaces 9 are created in the axial direction of the rotating shafts, through which material to be oriented can also exit. This contributes to further deterioration of the orientation effect.

Figure 4:
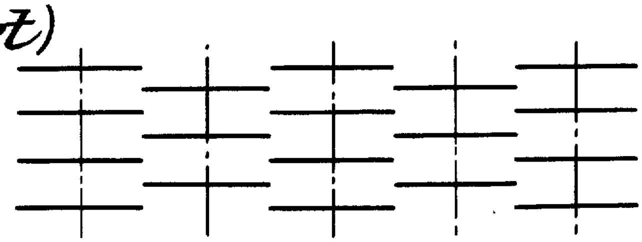
Fig. 4. (Prior Art)
FIG. 4 is a sectional view taken along line 4—4 of FIG. 1.

The sectional view of FIG. 4 further illustrates that the arrangement of FIG. 1 only orients chips in areas 12 where the discs 2,3 overlap one another. Total guidance of the chips from the theoretical entry to the first and second sets of discs 2,3 to the theoretical exit therefrom only occurs in the area of planes 13.

Figure 5:
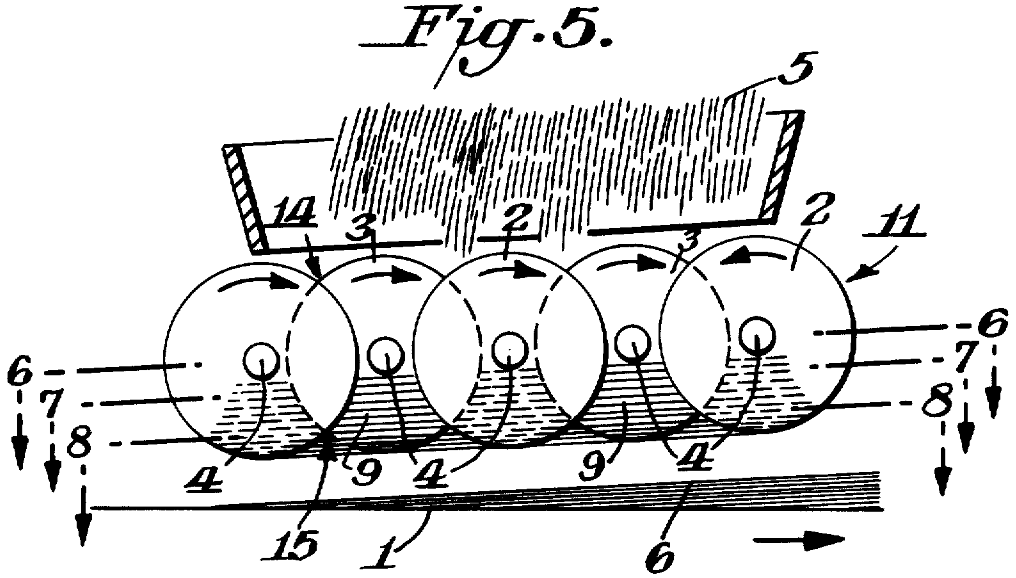
FIG. 5 is a side elevational view with portions in section illustrating apparatus for longitudinal orientation of wood chips, according to the present invention.
Figure 6:
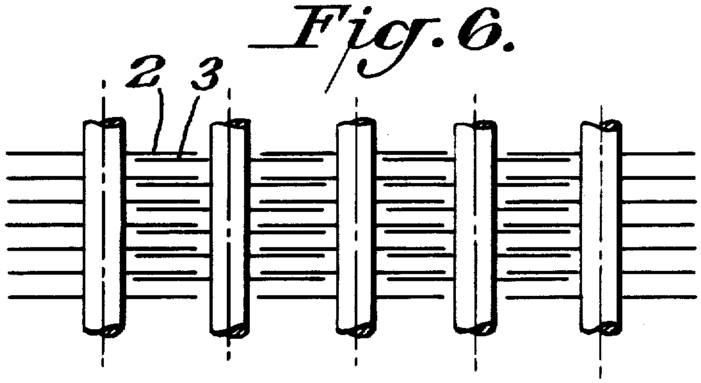
FIG. 6 is a sectional view taken along line 6—6 of FIG. 5.
Figure 7:
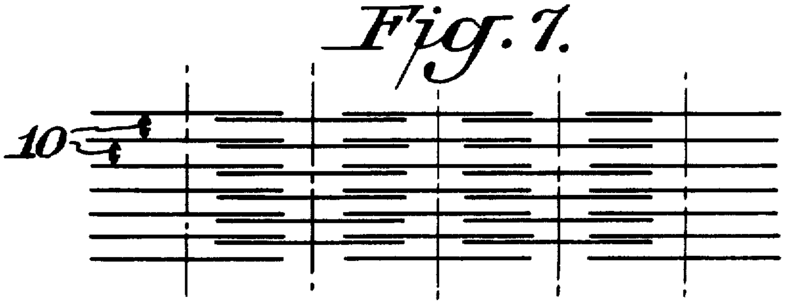
FIG. 7 is a sectional view taken along line 7—7 of FIG. 5.
Figure 8:
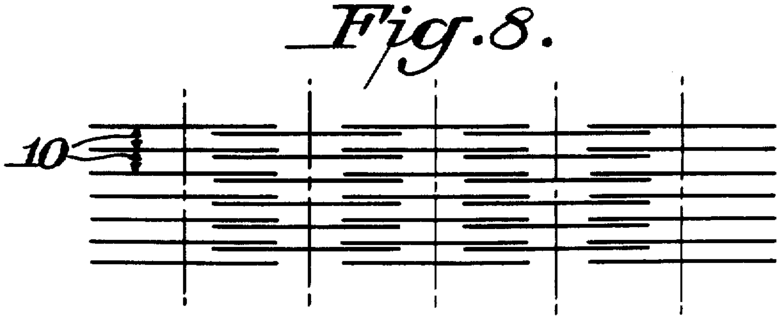
FIG. 8 is a sectional view taken along line 8—8 of FIG. 5.

FIG. 5 shows an arrangement of discs according to the present invention. The sectional views through FIG. 5 clearly show that non-oriented chip flow 5 is transported through a rotating closed disc grid 11 consisting of the first set of discs 2 and the second set of discs 3. Grid 11 maintains complete vertical guidance of the chips from first contact with the discs at point 14 to the last contact point with the discs at point 15. Unlike the prior art, the overlapping discs are very close to one another and the spacing 10 between the discs 2 or discs 3 is quite close.

The closed rotating disc grid 11 consisting of the first set of discs 2 and the second set of discs 3 may be lifted in relation to the forming belt 1 in such a manner that, according to the scattering angle of the oriented chips, it can be aligned over the chip mass 6 for production of OSB boards.

FIGS. 1 through 8 serve to clarify the significant differences between the state of the art and the present invention with respect to the function of a grid through which the strands and chips are not guided in the case of the state of the art but through which such chips and strands are guided from entry to exit according to this invention.

Figure 11:
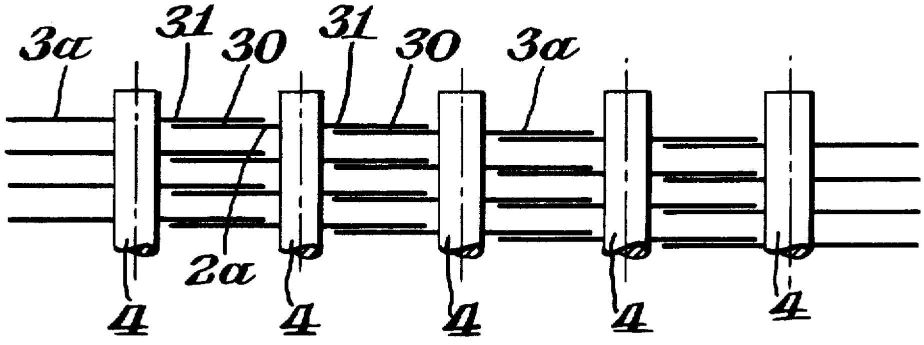
FIG. 11 is a sectional view similar to FIGS. 6-8 but illustrating another arrangement of the orientation discs.
Figure 10:
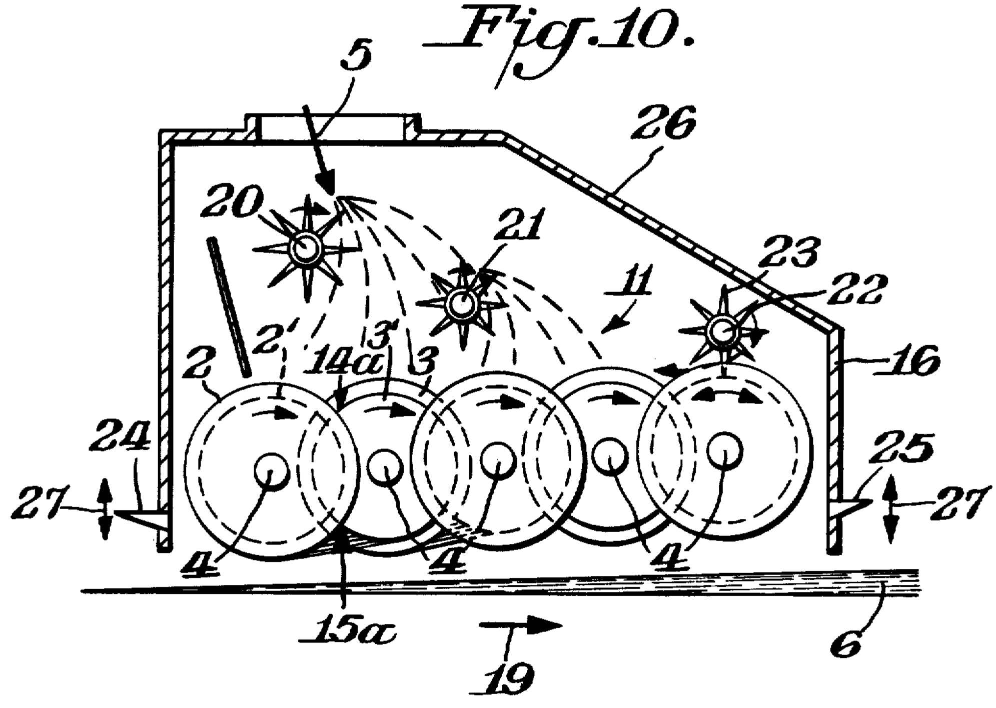
FIG. 10 is a side elevational view with portions in section illustrating another apparatus according to the present invention.
Figure 12:
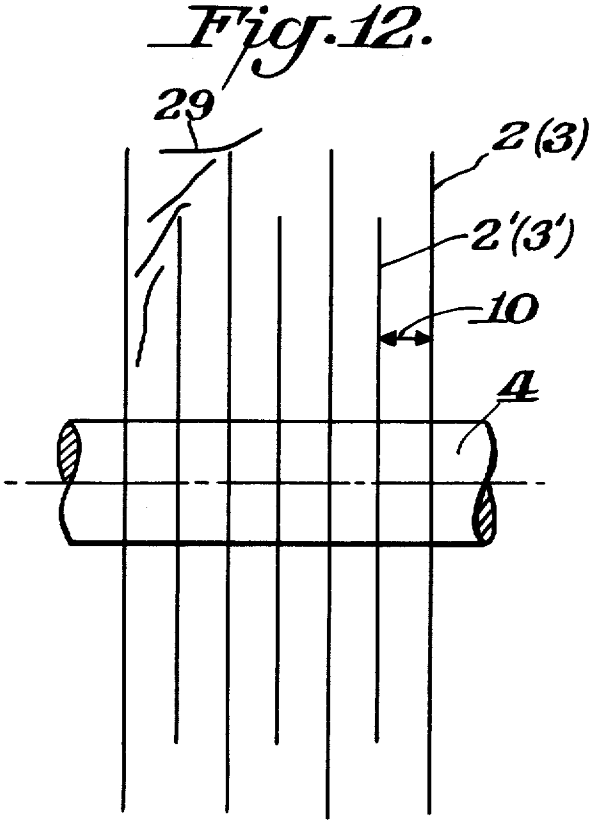
FIG. 12 is a diagrammatic view illustrating large and small orientation discs on a rotatable shaft and wood chips being aligned by the discs.

FIGS. 10-12 show an alternate embodiment wherein additional action is achieved by an arrangement that includes adjacent large and small discs. Each shaft 4 carries an alternating arrangement of large discs 2(3) and small discs 2′(3′). The spacing between the discs is represented by reference numeral 10.

Figure 9:
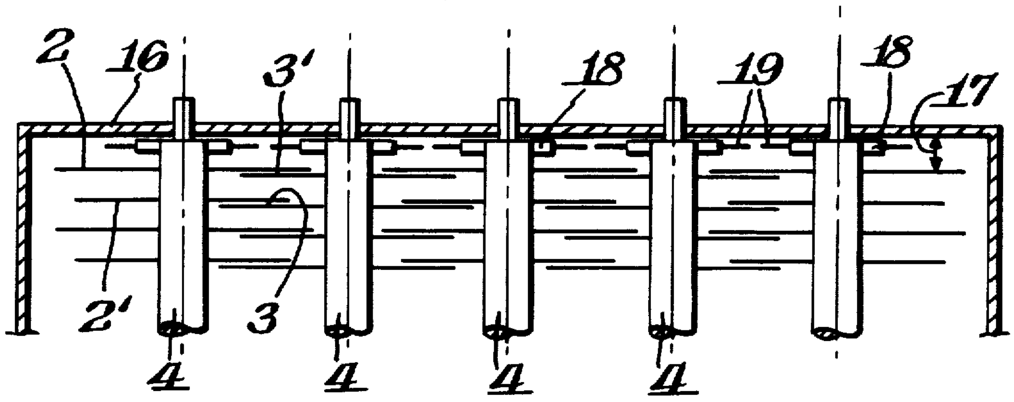
FIG. 9 is a top plan view with portions in section illustrating modified apparatus for the longitudinal orientation of wood chips, according to the present invention.

In FIG. 9, the rotating shafts 4 are supported in the housing 16, which shafts carry the first large discs 2 and the first small discs 2′ as well as the second large discs 3 and the second small discs 3′. A resulting slot 17 between the housing 16 and the large first and small second plates 2,3′, is interrupted by discs 18, having spikes 19 which are also arranged on the shafts 4. The discs 18 and spikes 19 remove the chips or strands accumulating in that area and they are transported through the slot 17.

The device of FIG. 10 also includes an arrangement that preliminarily disentangles the chip mass to be oriented for production of OSB boards, and the further feature of a throw-back roller. The first large discs 2 and the first small discs 2′ are arranged alternately on a shaft 4 and thus form a wave-shaped contour, perpendicular to the forward direction identified by arrow 19. The same applies to the second large disc 3 and the second small disc 3′ which are arranged on the next rotating shaft 4. Several such shafts 4 provided with discs 2,2′ and 3,3′ are arranged in series in the housing 16 in such a manner that in each case the large discs on one shaft 4 cooperate with the small discs on the subsequent shaft 4. The non-oriented chip mass 5, which has been disentangled in advance by the preliminary disentanglement rollers 20,21, is fed to the upper entry of the closed rotating disc grid 11. A throw-back roller 22, which cooperates with the last rotating shaft 4, is a suitable means for returning chip material which is too long and which may have advanced too far. The returned material is significantly longer than a double grid separation. The throw-back roller 22 is provided with spikes 23.

At opposite ends of the housing 16, auxiliary devices 24,25, are provided, by means of which the housing 16 may be tilted in relation to the horizontal position of the forming belt in accordance with the scattering angle of the oriented chip mass 6 (see double arrow 27). The preliminary disentanglement rollers 20,21, and the throw-back roller 22 may be arranged in a separate, encased structure 26, into which the unsorted chip flow 5 falls from above. As can be clearly recognized from FIG. 11, there is a constant guidance of the flow to be oriented during the orientation process, namely by utilization of large first discs 2 and small second discs 3', from the first contact point with a disc at 14*a* to the last contact point with a disc at 15*a*. The chip material to be oriented is actually and completely guided over the entire height of the orientation device.

If the device of FIG. 10 is operated without the preliminary disentanglement rollers 20,21, the rotation directions of the subsequent rotating shafts 4 may be selected alternately clockwise and counterclockwise. In those cases where the last rotating shaft rotates clockwise, it is recommended to use the throw-back roller 22, which is located above the last shaft and to let it rotate clockwise. In those cases where the last rotating shaft 4 rotates counterclockwise, the throw-back roller may be eliminated, such as shown in FIG. 5 for example.

Furthermore, FIG. 11 schematically represents an arrangement of rotating shafts 4 having improved self-cleaning action. With its outer side surface 30, the disc 2*a* cooperates with the inner side surface 31 of the disc 3*a*. The outer side surface of disc 3*a* cooperates with the inner side surface 31 of the disc 2. However, it is also possible to arrange the disc 2,3, 2*a* and 3*a* in such a reversed manner that in each case, the inner side surfaces 31 of the subsequent disc cooperate with the outer side surface 30 of the preceding disc in order to achieve additional self-cleaning action.

With reference to an example of large discs and small discs 2,2' and/or 3,3' mounted on a shaft 4, FIG. 12 shows as a result of the various diameters of subsequent discs, how a chip 29 penetrates into the grid, having a grid separation 10 slightly greater than half the length of the chip. This result is due to the fact that the distance between equally large discs 2(3) or small disc 2'(3') is only slightly greater than the average length of a chip to be oriented.

What is claimed:

1. A method for the longitudinal orientation of wood chips, particularly in the manufacture of OSB boards, comprising the steps of providing an arrangement of spaced apart discs on rotating shafts mounted parallel to one another above a moving forming belt upon which wood chips are deposited, positioning one side surface of each disc directly adjacent one side surface of a cooperating disc on an adjacent shaft, positioning the opposite side surface of each disc away from the opposite side surface of a cooperating disc on an adjacent shaft by an amount significantly greater than the spacing between the other side surfaces of cooperating discs, rotating the shafts and the discs thereon, flowing wood chips into the rotating discs, longitudinally orienting the wood chips between the side surfaces of the discs, and depositing the longitudinally oriented wood chips onto the forming belt.

2. A method as in claim 1 wherein the side surfaces of the rotating discs function to tilt the wood chips during orientation thereof.

3. A method as in claim 1 wherein one side surface of each disc touchingly engages one side surface of a cooperating disc on an adjacent shaft.

4. Apparatus for the longitudinal orientation of wood chips of varying lengths, particularly during the manufacture of OSB boards, comprising a rotating closed disc grid through which wood chips pass, the grid including an arrangement of horizontally disposed rotatable shafts mounted parallel to one another and extending in a longitudinal direction one after the other, a plurality of equally spaced apart vertically disposed discs connected to each shaft, each disc having a first side surface longitudinally oriented and closely adjacent a first side surface of a cooperating disc on an adjacent shaft, the opposite side surface of each disc being spaced away from the opposite side surface of a cooperating disc on an adjacent shaft by an amount significantly greater than the spacing between the first side surfaces of cooperating discs, and the spacing between the discs on the shafts being predetermined and approximately one-half the average chip length of the wood chips passing through the grid.

5. Apparatus as in claim 4 wherein the side surface portion of each disc directly adjacent the side surface portion of a cooperating disc on an adjacent shaft touchingly engages the cooperating disc.

6. Apparatus as in claim 4 wherein the plurality of discs on each shaft includes alternating large and small discs, and a large disc on one shaft cooperates with a small disc on an adjacent shaft.

7. Apparatus as in claim 4 wherein the plurality of discs on every other shaft are longitudinally aligned with one another.

8. Apparatus as in claim 4 including an upstanding enclosure closely surrounding the arrangement of rotatable shafts and discs.

9. Apparatus as in claim 8 wherein at least some of the discs at the ends of each shaft have radially extending spikes thereon to clear the spacing between those spiked discs and the enclosure.

10. Apparatus as in claim 4 including throw-back roller means mounted above the most forward rotatable shaft of the arrangement of shafts constructed and arranged to return chips too large to fall between the discs.

* * * * *